(12) United States Patent
Chen

(10) Patent No.: US 6,400,668 B1
(45) Date of Patent: Jun. 4, 2002

(54) CONTROL BUTTON MOUNTING STRUCTURE

(75) Inventor: Chih-Yoe Chen, Taoyuan Hsien (TW)

(73) Assignee: Enlight Corporation (TW)

( * ) Notice: Subject to any disclaimer, the term of this patent is extended or adjusted under 35 U.S.C. 154(b) by 0 days.

(21) Appl. No.: 09/572,065

(22) Filed: May 17, 2000

(51) Int. Cl.⁷ .......................... G11B 33/02; H05K 5/00; H05K 7/00; H01H 13/14; G06F 1/16
(52) U.S. Cl. ...................... 369/75.1; 361/684
(58) Field of Search .............................. 369/75.1, 77.1, 369/77.2; 361/679, 684, 685, 686; 200/296, 52 R, 61.58 R, 345, 521

(56) References Cited

U.S. PATENT DOCUMENTS 5,476,261 A * 12/1995 Hultstrand .............. 273/148 B
5,495,391 A * 2/1996 Kirk ........................... 361/684

FOREIGN PATENT DOCUMENTS

JP 07326250 A * 12/1995 .......... H01H/13/14
JP 08237352 A * 9/1996 ............ H04M/1/23

* cited by examiner

Primary Examiner—William Klimowicz
(74) Attorney, Agent, or Firm—Troxell Law Office PLLC

(57) ABSTRACT

A control button mounting structure includes a press member suspended behind the face panel of a computer in front of a disk player. for example, a CR-ROM or DVD player, and a button knob mounted in the face panel of the computer and depressed to force the press member against an ejection control button of the disk player in opening/closing the disk player, the press member having a row of upright coupling barrels raised from a front side wall thereof and coupled to the button, and multiple press blocks extended from a bottom side wall thereof and with one press block stopped at the ejection control button of the disk player, the button knob having two bottom rods selectively coupled to the coupling barrels of the press member for enabling the press member to be moved with the button to press the ejection control button of the disk player.

1 Claim, 4 Drawing Sheets

CONTROL BUTTON MOUNTING STRUCTURE

BACKGROUND OF THE INVENTION

The present invention relates to a control button mounting structure for use with any of a variety of computers for operation to press the ejection control button of a disk player (CD-ROM or DVD player) in the computer in which the control button mounting structure is installed.

A standard personal computer is equipped with a CD-ROM or DVD player. The CD-ROM or DVD player has an ejection control button controlled by an external control button mounted in a hole on the face panel of the personal computer. Because the position of the ejection control button varies with the model of the CD-ROM or DVD player, the structure of the external control button must fit the position of the ejection control button of the CD-ROM or DVD player to be used, i.e., different external control buttons shall be used to fit different models of CD-ROM or DVD players.

SUMMARY OF THE INVENTION

The present invention provides a control button mounting structure, which is suitable for use with any of a variety of personal. computers to fit any of a variety of disk players. According to the present invention, the control button mounting structure comprises a press member suspended behind the face panel of a computer in front of a disk player, for example, a CD-ROM or DVD player, and a button knob mounted in the face panel of the computer and depressed to force the press member against the ejection control button of the disk player in opening/closing the disk player. The press member comprises a row of upright coupling barrels raised from a front side wall thereof and coupled to the button, and a plurality of press blocks extended from a bottom side wall thereof and with one press block stopped at the ejection control button of the disk player. The button knob comprises two bottom rods selectively coupled to the coupling barrels of the press member for enabling the press member to be moved with the button to press the ejection control button of the disk player.

DETAILED DESCRIPTION OF THE PREFERRED EMBODIMENT

Figure 1:
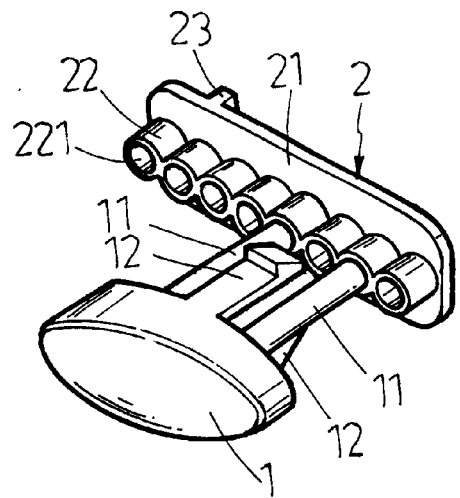
FIG. 1 is a perspective view of a control button mounting structure according to the present invention.
Figure 2:
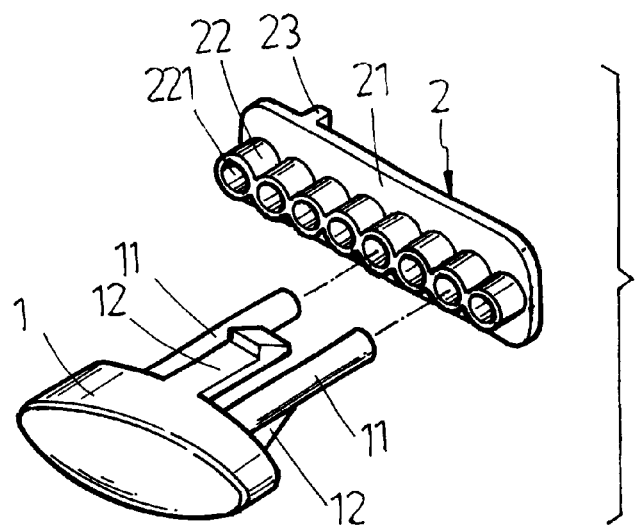
FIG. 2 is an exploded view of the control button mounting structure shown in FIG. 1.

Referring to FIGS. from 1 through 4 and 7, a control button mounting structure is shown installed in a recessed wall portion 4 of the face panel of a computer, comprised of a button knob 1, and a press member 2. The button knob 1 comprises two parallel bottom rods 11, and two parallel bottom hooks 12 bilaterally spaced between the bottom rods 11. The bottom rods 11 are longer than the bottom hooks 12. The press member 2 is a flat member comprising a row of upright coupling barrels 22 raised from the front side wall thereof each defining a recessed positioning hole 221, and two press blocks, namely, the first press block 23 and the second press block 24 bilaterally extended from the bottom side wall thereof near one end.

Figure 3:
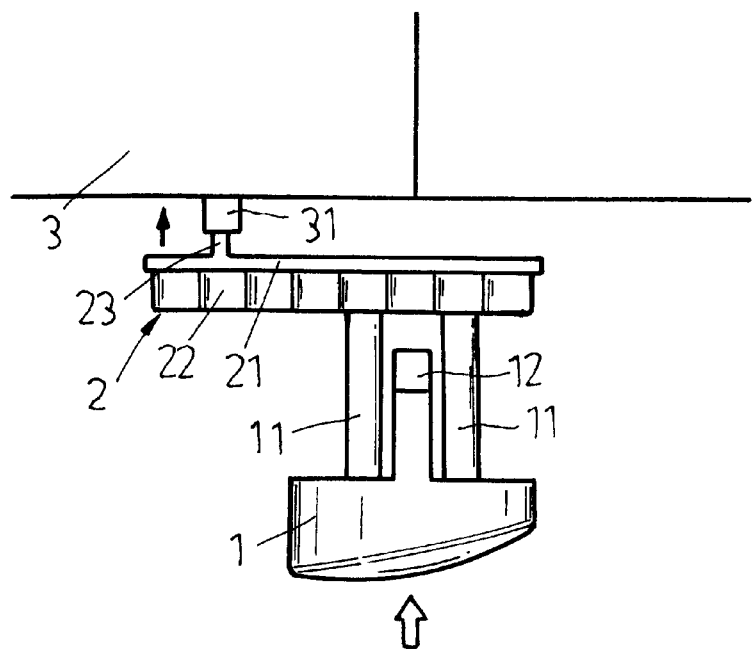
FIG. 3 is a top plain view showing an installation example of the present invention.
Figure 4:
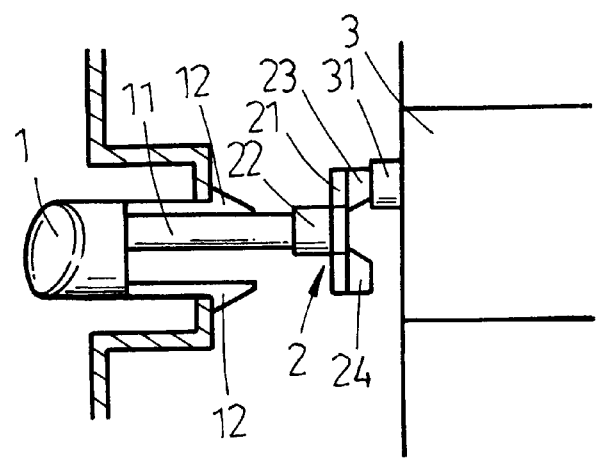
FIG. 4 is a side view of FIG. 3.

Referring to FIGS. 3 and 4 again, the press member 2 is suspended in the computer behind the recessed wall portion 4 of the face panel with the first press block 23 stopped at the ejection control button 31 of a disk player, for example, a CD-ROM or DVD player 3 in the computer, and the bottom rods 11 and bottom hooks 12 of the button knob 1 are inserted through an opening (not shown) in the recessed wall portion 4 of the face panel of the computer with the bottom rods 11 respectively fitted into the recessed positioning hole 221 on each of two corresponding upright coupling barrels 22 at the press member 2. When not depressed, the bottom hooks 12 are hooked on the back surface of the recessed wall portion 4 of the face panel of the computer to stop the button knob 1 from falling out of the recessed wall portion 4 of the face panel (see FIG. 4). When pressing the button knob 1, the bottom rods 11 give a pressure to the press member 2 against the ejection control button 31 of the disk player 3, and therefore the CD-ROM player 3 is driven to open (or close).

Figure 5:
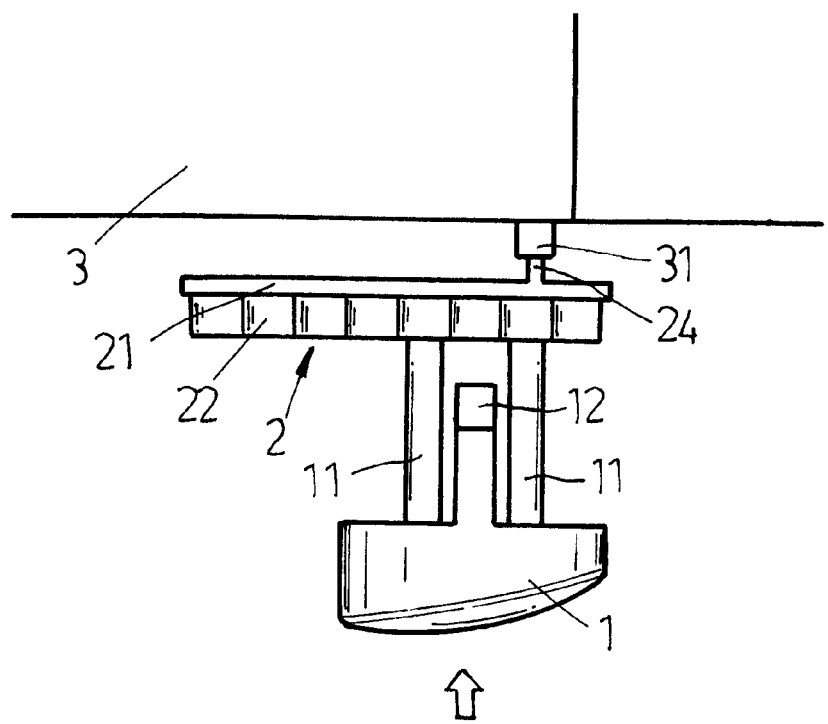
FIG. 5 is a top plain view showing another installation example of the present invention.
Figure 6:
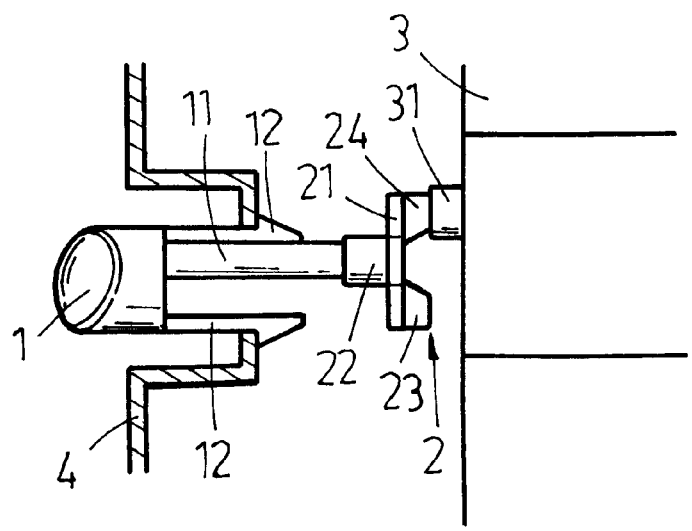
FIG. 6 is a side view of FIG. 4.
Figure 7:
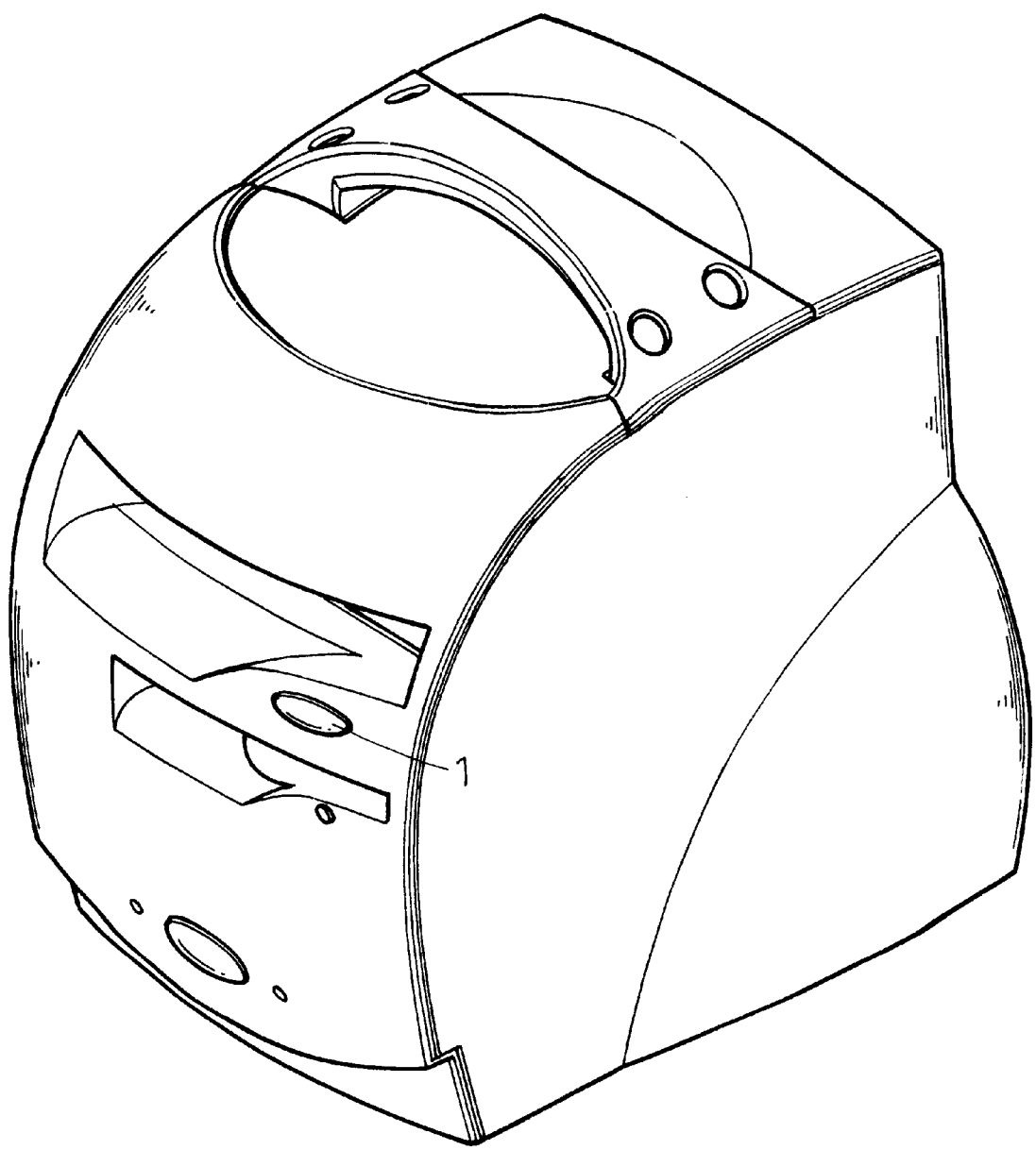
FIG. 7 is an elevational view of a computer showing the control button mounting structure installed in the face panel according to the present invention.

Referring to FIGS. 5 and 6, the position of the press block 2 can be changed through 180° angle to fit the position of the disk player 3 in the computer, enabling the second press block 24 to be stopped at the ejection control button 31 of the disk player 3.

While only one embodiment of the present invention has been shown and described, it will be understood that various modifications and changes could be made thereunto without departing from the spirit and scope of the invention disclosed.

What the invention claimed is:

1. A control button mounting structure installed in the face panel of a computer and controlled to press the ejection control button of a disk player in the computer, comprising a press member suspended behind the face panel of said computer in front of said disk player, said press member comprising a row of upright coupling barrels raised from a front side wall thereof, and a plurality of press blocks extended from a bottom side wall thereof with one of said press blocks stopped at the ejection control button of said disk player. and a button knob mounted in a hole on the face panel of said computer and depressed to force said press member against the ejection control button of said disk player, said button knob comprising two parallel bottom hooks inserted through the hole on the face panel of said computer for hooking on a back side wall of the face panel of said computer to stop said button knob from falling out of the face panel of said computer, and two parallel bottom rods bilaterally spaced between said bottom hooks and inserted through the hole on the face panel of said computer and selectively coupled to the coupling barrels of said press member for enabling said press member to be moved with said button knob to press the ejection control button of said disk player.

* * * * *